United States Patent [19]

Shimano

[11] Patent Number: 4,503,729

[45] Date of Patent: Mar. 12, 1985

[54] DROP TYPE HANDLE FOR A BICYCLE

[75] Inventor: Keizo Shimano, Sakai, Japan

[73] Assignee: Shimano Industrial Company Limited, Osaka, Japan

[21] Appl. No.: 238,646

[22] Filed: Feb. 26, 1981

[30] Foreign Application Priority Data

Jul. 28, 1980 [JP] Japan .......................... 55-106565[U]

[51] Int. Cl.³ ............................................. B62K 21/12
[52] U.S. Cl. ................................. 74/551.1; D12/178
[58] Field of Search ................. 74/551.1, 551.4, 551.6, 74/543, 551.2; D12/178

[56] References Cited

U.S. PATENT DOCUMENTS

| D. 96,636 | 8/1935 | Van Doren et al. | 74/551.1 |
|---|---|---|---|
| 379,955 | 3/1888 | Hedger | 74/551.1 |
| 390,952 | 10/1888 | Drake | 74/551.1 |
| 511,479 | 12/1893 | Westbrook | 74/551.4 |
| 602,600 | 4/1898 | Green | 74/551.4 |
| 1,616,021 | 2/1927 | Arzens | 74/551.2 |
| 3,803,937 | 4/1974 | Johnston | 74/551.6 |

FOREIGN PATENT DOCUMENTS

| 0035855 | 9/1981 | European Pat. Off. | |
|---|---|---|---|
| 1024529 | 1/1953 | France | 74/551.1 |
| 1074141 | 3/1954 | France | 74/551.1 |
| 2326324 | 10/1975 | France | |
| 2349487 | 4/1976 | France | |
| 2366165 | 10/1976 | France | |
| 414867 | 8/1946 | Italy | 74/551.1 |
| 175462 | 12/1952 | Netherlands | 74/551.1 |
| 12218 | of 1896 | United Kingdom | 74/551.1 |
| 17314 | of 1896 | United Kingdom | 74/551.4 |

Primary Examiner—Kenneth J. Dorner
Attorney, Agent, or Firm—Stevens, Davis, Miller & Mosher

[57] ABSTRACT

A drop type handle for a bicycle, comprising a first bar body horizontally extending and second bar bodies which have first bent portions in continuation of both lengthwise ends of the first bar body and extending forwardly in a curved manner, second bent portions in continuation of the front ends of the first bent portions and curving downwardly and rearwardly, and second straight portions in continuation of the lower rear ends of second bent portions and extending rearwardly. The first bar body has first grip portions inclined rearwardly and downwardly at lengthwise outer ends with respect to first straight portions at the bar body, and the second bar bodies have second gripping portions being inclined at the front sides inwardly and downwardly with respect to the forward extension lines of the first bent portions respectively, and having third gripping portions inclined at the front sides inwardly with respect to the rearward extension lines of the second straight portions.

10 Claims, 14 Drawing Figures

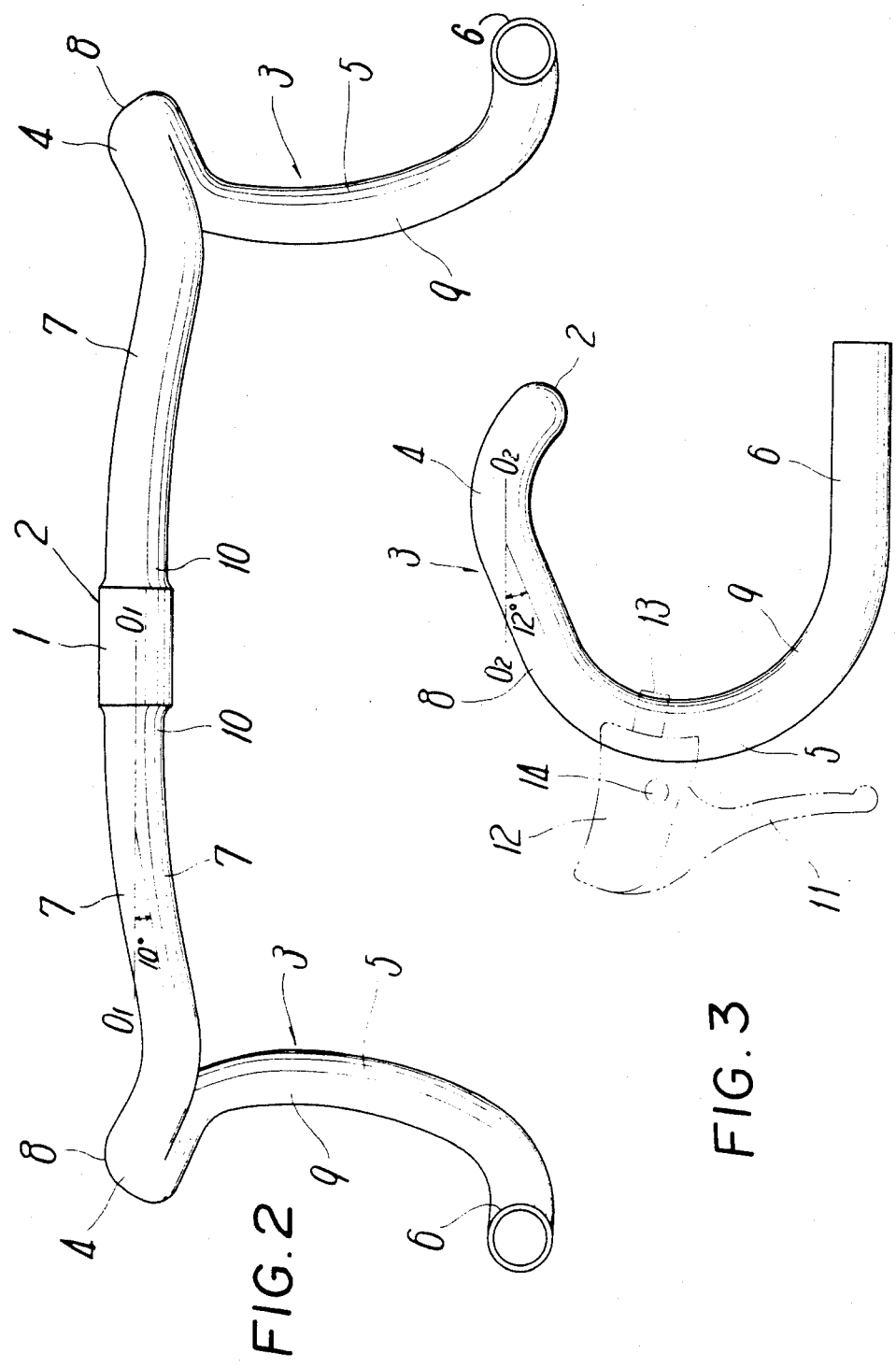

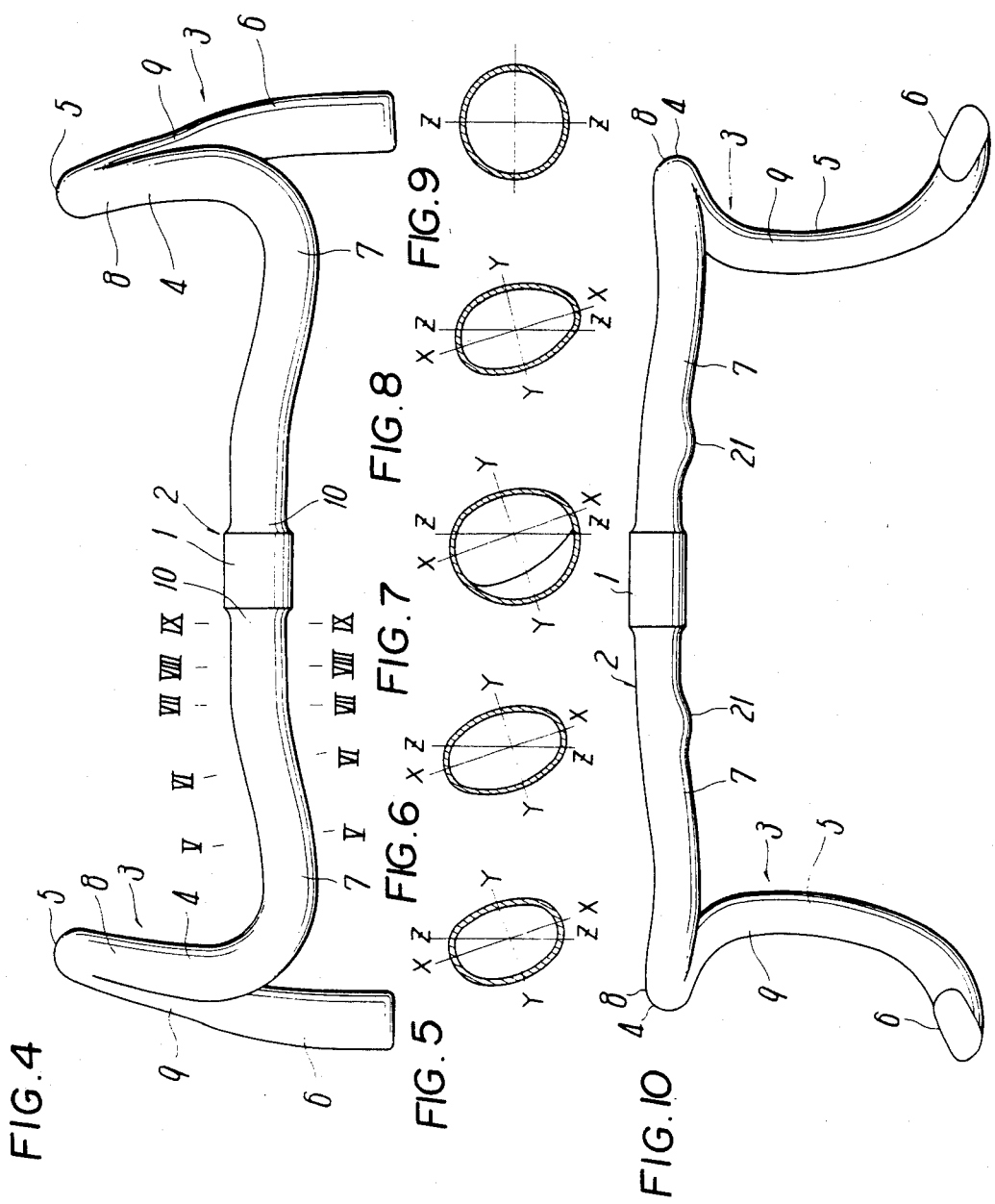

FIG.11
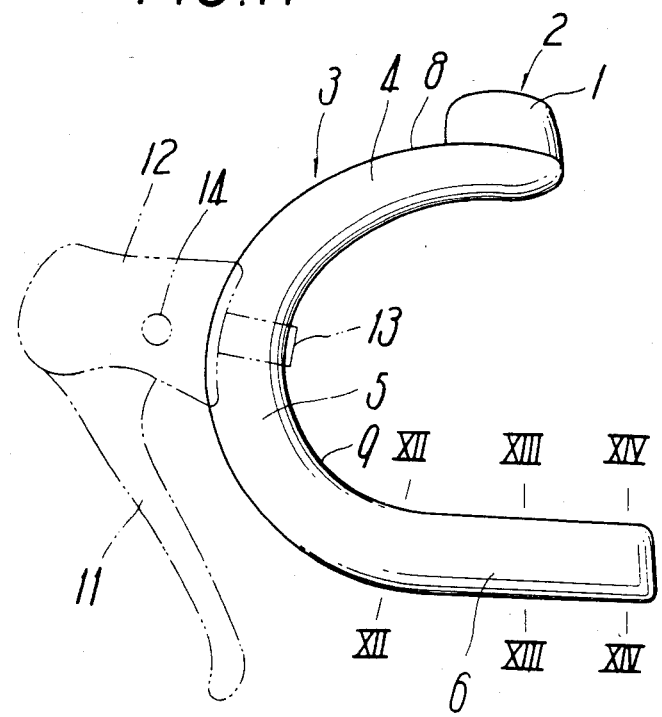
FIG.12  FIG.13  FIG.14
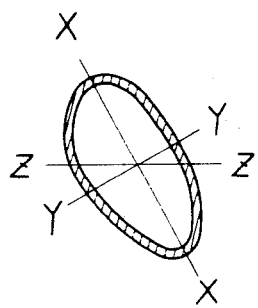 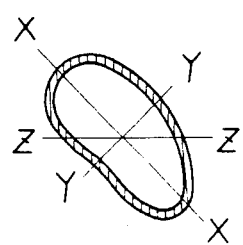 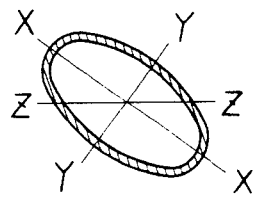

DROP TYPE HANDLE FOR A BICYCLE

FIELD OF THE INVENTION

This invention relates to a drop type handle for a bicycle which is mounted on a handle stem supported rotatably to the bicycle frame. More particularly, the invention relates to a drop type handle which is used for a racing bicycle or cycling bicycle and comprises a first bar body extending horizontally and additional bar bodies each having a bent portion in continuation of the first bar body.

BACKGROUND OF THE INVENTION

Generally, a drop type handle for a bicycle comprises a first bar body and an additional pair of bar bodies. The first bar body, the same as a flat type handle, is provided at the center with a mounting portion for the handle stem and extends straight horizontally outwardly from both lengthwise ends of the mounting portion. The additional pair of bar bodies comprise first bent portions in continuation with both lengthwise ends of the first bar body and extending forwardly thereof in a curved manner, second bent portions in continuation of the utmost ends of the first bent portions and curving downwardly and rearwardly thereof, and straight portions provided in continuation of the lower rear ends of the second bent portions and extending rearwardly thereof. The first bent portions each extend from both ends of the first bar body forwardly at right angles with respect to the lengthwise center line. The second bent portions curve in the same direction as the first bent portions. A plan view of the straight portions show that they are formed to overlap the first bent portions.

First gripping portions are provided at both lengthwise ends of the first bar body constructed according to the foregoing, second gripping portions are provided at portions extending from the front portions of the first bent portions to the upper rear ends of the second bent portions, and third gripping portions are provided at portions extending from the lower rear ends of the second bent portions to the straight portions respectively.

A driver drives the bicycle gripping a selected one of the above three gripping portions. When driving the bicycle at high speed, e.g., 30 km/h or more, or on a steep upward slope, he grips the third gripping portions at the lower most position and bends his upper body low and forward to reduce wind pressure against him while strongly treadling. When driving at a low speed of 20 km/h or less, he grips the first gripping portions and raises his upper body in a posture to watch forward because of less wind pressure and no necessity for strong pedalling. When driving it at a middle speed of 20 to 30 km/h, he grips the second gripping portions moderately bending his upper body.

In a conventional drop type handle, since the first gripping portions are provided at the first bar body of a straight form and the second and third gripping portions are provided at the second bar bodies extending forwardly at right angles with respect to the first bar body, it is difficult for the driver to grip these gripping portions in a natural posture and fit his palms to them. Hence, the problem araises in that the driver takes an unstable posture and needs a large fatiguing grasping power when driving the bicycle.

Furthermore, each bar body at the conventional drop type handle is made from a round pipe, so that the driver, when strongly pedalling, should grip each bar body in a squeezing manner. According, another problem is created in that the driver's fingers are smaller in muscular strength than his wrists, elbows or shoulders, and bear the load, so that the driver becomes more fatigued when driving the bicycle for a long time.

The driver, except for when driving the bicycle on an upward slope, grips the first gripping portions lightly by his fingers keeping his elbows straight and palms on the first gripping portions, so that the first gripping portions bear the weight of his upper body through his palms. In this instance, the palms press-contact the first gripping portions of a round pipe, thereby being locally subjected to the weight, resulting in the driver becoming fatigued even during a short driving time.

The driver, when strongly pedalling the bicycle on an upward slope, will grip the first gripping portions more firmly than in the aforesaid condition. In this instance, he should turn his wrists to change his gripping condition from placing his palms on the first bar body to squeezing it by his fingers. As a result, such grip-change action causes the driver to steer the handle temporarily in an unstable condition and delays changing his driving condition.

SUMMARY OF THE INVENTION

A main object of the invention is to provide a drop type handle with superior human engineering to permit a driver to grip each gripping portion at the handle bar in a stable condition and in a natural posture to avoid fatigue from driving the bicycle. Another object is to provide a drop type handle which can be manipulated by the driver gripping it in a stable condition even when his fingers are weak so he can steer the bicycle from a comfortable posture, whereby he experiences less fatigue.

A drop type handle according to the invention has first gripping portions at a first bar body and second and third gripping portions at second bar bodies, these gripping portions being formed to be gripped by the driver in his natural posture. This invention is characterized in that the first the first gripping portions are inclined rearwardly and downwardly with respect to a mounting portion provided at the center of the first bar body and with respect to first straight portions in continuation of the mounting portion. The second gripping portions are inclined at the front sides thereof inwardly and downwardly with respect to the forward extension lines of first bent portions at the second bar bodies. The third gripping portions are inclined at the front sides thereof inwardly with respect to the rearward extension lines of the second straight portions at the second bar bodies.

A second characteristic is that the first bar body at both lengthwise sides thereof with respect to the mounting portion is made elliptic in cross section, the ellipse having the major axis and minor axis perpendicularly intersecting each other, the major axis being directed longitudinally of the bicycle.

The aforesaid major axis is slanted at its front end gradually downwardly with respect to the horizontal line outwardly from the mounting portion. Hence, the major axis slanted and directed as the foregoing enables the driver gripping the first gripping portions to stably hold it by his fingers even with little exertion, thereby reducing his fatigue. Furthermore, the driver, when applying his weight onto the first bar body by his stretched elbows, can easily change the driving condition by gripping the bar body as he pulls it toward himself with a slight grip only, in which he need not squeeze the bar body.

Furthermore, the driver, when gripping the handle bar as he pulls it, need not grip the bar body by pressing his fingers thereon, but it is sufficient to apply with his fingers a force against the bar body pulling force, whereby the drivers fingers become less fatigued even when gripping the handle for a long time.

Moreover, in the aforesaid construction, the first gripping portions at the first bar body are provided at the ends at the mounting portion side with swollen portions projecting downwardly from the lower surfaces of the bar bodies respectively, thereby preventing an outward slip of the driver's hand. Hence, he little grasping power to prevent the slip, thereby avoiding excessive fatigue to his fingers.

BRIEF DESCRIPTION OF THE DRAWINGS

FIG. 2 is a rear view of the FIG. 1 embodiment,

FIG. 3 is a side view thereof,

FIG. 4 is a plan view of a modified embodiment of the invention,

FIGS. 5 through 9 are enlarged sectional views taken on the lines V—V through IX—IX in FIG. 4 respectively, FIG. 10 is a rear view of the FIG. 4 embodiment, FIG. 11 is side view thereof, and FIGS. 12 through 14 are enlarged sectional views taken on the lines XII—XII through XIV—XIV in FIG. 11.

DETAILED DESCRIPTION OF THE INVENTION

Figure 1:
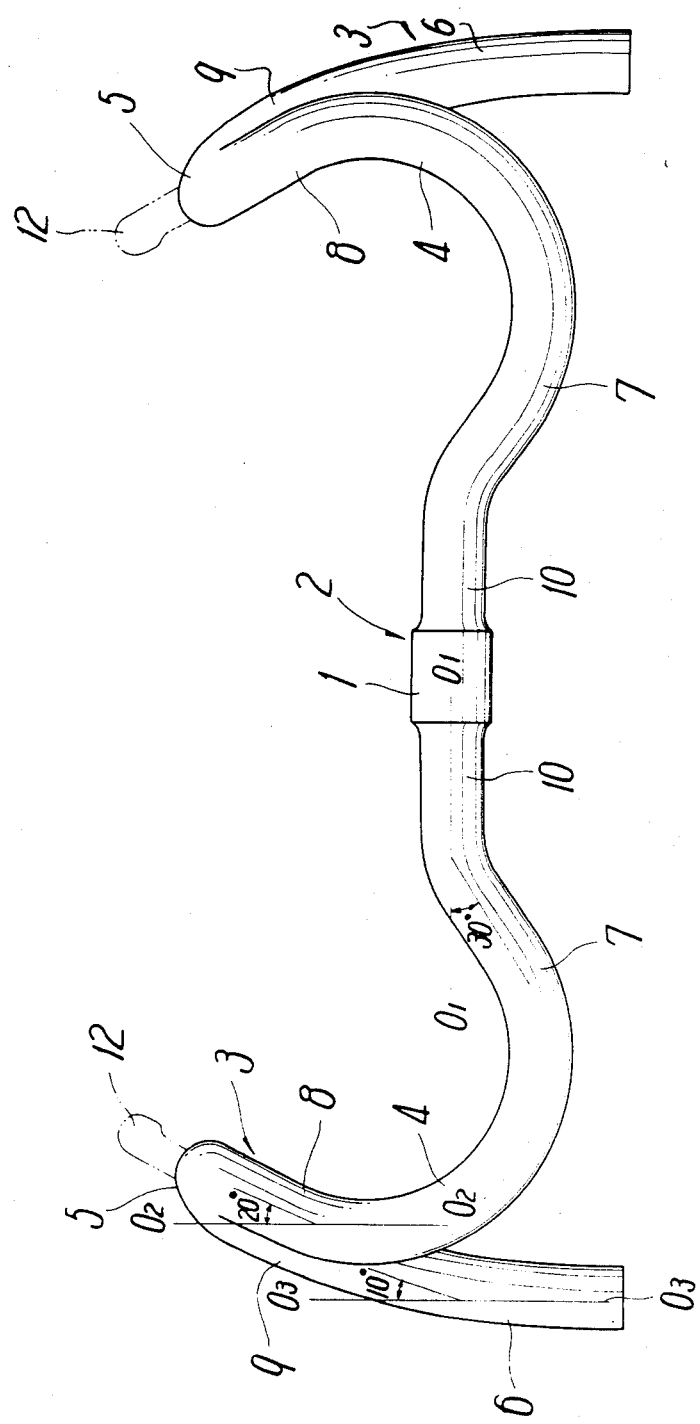
FIG. 1 is a plan view of an embodiment of a drop type handle of the invention.

A drop type handle of the invention, similar to a well-known drop type handle, is mounted on a handle stem (not shown) supported rotatably to the bicycle frame, and comprises a first bar body 2 having at the central portion a mounting portion 1 for the handle stem and extending horizontally from both sides of mounting portion 1, and a pair of second bar bodies 3 in continuation of both lengthwise ends of first bar body 2. The second bar bodies 3 each comprise a first bent portion 4 in continuation of one lengthwise end of first bar body 2 and extending forwardly therefrom in a curved manner, a second bent portion 5 in continuation of the front end of first bent portion 4 and curving downwardly and rearwardly thereof, and a second straight portion 6 in continuation of the lower rear end of second bent portion 5 and extending rearwardly therefrom.

The first bar body 2 has at both lengthwise sides thereof first gripping portions 7. The second bar bodies 3 each have a second gripping portion 8 at a portion extending from the fron end of first bent portion 4 to the upper rear end of second bent portion 5, and a third gripping portion 9 at a portion extending from the lower rear end of second bent portion 5 to the second straight portion 6.

In the drop type handle of the invention according to foregoing, the first gripping portions 7, as shown in FIGS. 1 and 2, are inclined at the lengthwise outer sides rearwardly and downwardly with respect to the center line $O_1$—$O_1$ of the mounting portion 1 and a first straight portion 10 in continuation thereof. The second gripping portions 8, as shown in FIG. 1, are inclined at the front sides inwardly and downwardly with respect to the forward extension line $O_2$—$O_2$ of each first bent portion 4. The third gripping portions 9, as shown in FIG. 1, are inclined at the front sides inwardly with respect to the rearward extension line $O_3$—$O_3$ of each second straight portion 6.

An angle of inclination at the respective gripping portions 7 through 9 is not particularly defined, but it is preferable that the first gripping portions 7 each make an angle of inclination of 30° or its approximation rearward from the center line $O_1$—$O_1$ of first straight portion 10, and that of 10° or its approximation downward from the same line.

It is preferable that the second gripping portions 8 each make an angle of inclination of 20° or its approximation inward from the extension line $O_2$—$O_2$ of the first bent portion 4, and that of 12° or its approximation downward from the same line, and that the third gripping portions 9 each make an angle of inclination of 10° or its approximation inward from the extension line $O_3$—$O_3$ of second straight portion 6.

In addition, the terms "rearward", "downward" and "inward" mean rearward in the longitudinal direction of the bicycle, vertically downward, and laterally toward the longitudinal center line of the bicycle respectively.

When the driver drives the bicycle gripping the respective gripping portions 7 through 9 selectively according to the desired speed, each inclined gripping portion enables him to fit his palm similar to his natural posture. Hence, he can stably grip the handle and impose his weight thereon in a uniform dispersing condition through his palms, thereby suffering less fatigue from driving the bicycle even after a long time.

The drop type handle for the bicycle, as shown in FIGS. 1 and 3, mounts brake control levers 11 at the central portions of second bent portions 5 respectively, the control levers 11 being pivoted through pivot pins 14 to bracket members 12 fixed to second bent portions 5 through bands 13 respectively and extending nearly along second bent portions 5.

In this instance, each bracket 12 serves as a stopper for the driver's hand gripping the second gripping portion 8, and the driver can operate the control lever 11 by his forefinger or middle finger while gripping the second and third gripping portions 8 and 9 by his hands.

In the aforesaid embodiment, the bar bodies 2 and 3 round in cross section may alternatively be modified in cross section as shown in FIGS. 4 through 14, thereby enabling the driver to more easily grip the bar body and become less fatigued.

Referring to FIGS. 4 through 9, the first bar body at the aforesaid drop type handle is made elliptic in cross section at both longitudinal sides wth respect to the mounting portion 1. The ellipse has the major axis X—X and minor axis Y—Y perpendicularly intersecting each other, the major axis X—X being directed longitudinally of the bicycle and slanted at the front end downwardly in steps with respect to the horizontal line Z—Z, laterally outwardly of the bicycle from the mounting portion 1 as shown in FIGS. 5 through 9.

In other words, the first bar body 2, as shown in FIG. 6, is round in cross-section at the mounting portion 1 and in the vicinity thereof and elliptic in cross section at the portions outward from the mounting portion 1. The angle of inclination of the major axis X—X with respect to the horizontal line Z—Z becomes larger in steps outwardly from the mounting portion 1. An angle of inclination at each position, as shown in FIGS. 5 through 9, is 18° (FIG. 8), 19° (FIG. 7), 20° (FIG. 6) and 22° (FIG. 5).

The first gripping portions 7, as shown in FIGS. 7 and 10, each have a downwardly swollen portion 21 at the lower portion of the end portion at a side of the mounting portion 1. The swollen portions 21 intercept the thumbs of driver's hands gripping the first gripping portions 7 to thereby prevent his hands from slipping outwardly sideways. Although such a slip of the driver's hand, conventionally, is prevented by friction between his palm and the first bar body, the swollen portion 21 becomes a hold for his thumb preventing slipping of the driver's hand.

Next, the case where the driver grips the first gripping portions 7, will be detailed.

First, the driver, when lightly pedalling, stretches his elbows and places his palms on the first bar body 2 to impose his weight thereto through the palms, in which he is gripping the handle lightly by fingers.

In this instance, the first bar body 2 elliptic in cross section fits a hollow of each palm of the driver's hand placed on the first bar body 2 along the major axis of the ellipse section, so that his weight is distributed, thereby enabling him to become less fatigued from gripping the handle.

The first bar body 2 also is inclined at its outward portion rearwardly downwardly, so that the driver can transfer his weight to the first bar body 2 through his shoulders and palms in his natural posture.

The driver, when driving the bicycle on an upward slope, strongly pedals and firmly grips the first bar body 2 as he pulls it toward himself. The first bar body 2 is elliptic in cross section and the major axis X—X of the ellipse is slanted step by step downwardly with respect to the horizontal line Z—Z, and the driver's fingers are already placed on each position of first bar body 2 in a twisting manner, so that he need not change his grip, but can easily squeeze the first bar body 2 with a larger grasping power. As a result, he can adjust to a change in driving condition without changing his grip.

When he grips the first bar body 2 as he pulls it toward himself, his fingers twist and hook each position at the bar body 2 to thereby grip it with a small grasping strength. As a result, the fingers having little musclar strength will avoid bearing a load from grasping.

In other words, the driver will save energy when his fingers hook the first bar body 2 against the pulling force therefor in order not to leave it, rather than when presscontacting the first bar body 2, whereby he becomes less fatigued to that extent. Furthermore, such gripping by way of the driver's fingers and the aforesaid formation of first bar body 2 can fully utilize the strong muscular power of the shoulders or elbows, and the fingers are sufficiently strong against the pulling force. Accordingly, the driver, when driving the bicycle in the above condition, becomes less fatigued.

The bent portions 4 and 5 and second straight portions 6 at the second bar bodies 3, are made elliptic in cross section. The major axis X—X of the ellipse in cross section of each first bent portion 4 is directed laterally of the bicycle gradually along its curve from the outward end of first bar body 2, and made smaller in length forwardly of each first bent portion 4. At the second bent portion 5, the major axis X—X is directed longitudinally of the bicycle, and then is directed again laterally thereof at the second straight portions 6.

The major axes X—X at second straight portion 6, as shown in FIGS. 10 and 12 through 14, are slanted at the front ends inwardly and upwardly with respect to the outer ends respectively.

Hence, the dirver, when gripping the third gripping portions 9, can bring his palms into contact therewith keeping his natural posture and also grip them in a squeezing manner, thereby readily increasing his grasping power without applying greater strength.

While an embodiment of the invention has been shown and described, the invention is not limited to the specific construction thereof, which is merely exemplary in the spcification rather than defined thereby.

What is claimed is:

1. In a drop type handle for a bicycle comprising a first bar body which has at its central portion a mounting portion for a handle stem and extends horizontally outwardly from both sides of said mounting portion, and a second pair of bar bodies which are formed in continuation of both lengthwise ends of said first bar body, the improvement wherein, when said handle is mounted on a handle stem of a bicycle in proper operating position for a drop type handle, said first bar body has at both lengthwise sides thereof first gripping portions, each of said first gripping portions being inclined at its lengthwise outer end in a direction rearwardly and downwardly with respect to said mounting portion and to first straight portions in continuation of said mounting portion, and said second bar bodies have first bent portions which are formed in continuation of both lengthwise ends of said first bar body and extend forwardly along a curve, second bent portions which are formed in continuation of foremost ends of said first bent portions and curved downwardly and rearwardly thereform, second straight portions which are formed in continuation of lower rear ends of said second bent portions respectively, second gripping portions positioned at portions extending from front portions of said first bent portions to upper rear end portions of said second bent portions, and third gripping portions positioned at portions extending from lower rear end portions of said second bent portions to said second straight portions respectively, each of said second gripping portions being inclined at its front side inwardly and downwardly with respect to a forward extension line of each of said first bent portions, each of said third gripping portions being inclined at its front side inwardly with respect to a rearward extension line of each of said second straight portions.

2. The improved drop type handle for a bicycle according to claim 1, wherein each of said first gripping portions makes an angle of inclination of 30° or its approximation rearwardly, and that of 10° or its approximation downwardly, with respect to said mounting portions and to each of said first straight portions in continuation thereof.

3. The improved drop type handle for a bicycle according to claim 1 or 2, wherein each of said second gripping portions makes an angle of inclination of 20° or its approximation inwardly, and that of 12° or the approximation downwardly, with respect to a forward extension line of each of said first bent portions.

4. The improved drop type handle for a bicycle according to claim 1, 2 or 3, wherein each of said third gripping portions makes an angle of inclination of 10° or its approximation inwardly with respect to the rearward extension line of each of said second straight portions.

5. The improved drop type handle for a bicycle according to claim 1, wherein said first bar body is formed with an elliptical cross section at both lengthwise sides with respect to said mounting portion, said cross section having a major axis and minor axis perpendicularly intersecting each other, said major axis being directed longitudinally of the bicycle.

6. The improved drop type handle for a bicycle according to claim 5, wherein the major axis of the cross section of said first bar body is arranged to be slanted at a front end stepwise downwardly with respect to a horizontal line outwardly from said mounting portion.

7. The improved drop type handle for a bicycle according to claim 5 or 6, wherein each of said first gripping portions at said first bar body has a swollen portion at one end at a side of said mounting portion, said swollen portion projecting downwardly from the lower side of each of said first gripping portions.

8. The improved drop type handle for a bicycle according to claim 1, wherein said first bar body is formed in an elliptical cross section at both lengthwise sides with respect to said mounting portion, and each of said second bar bodies, including said first and second bent portions and second straight portion, is formed in an elliptical cross section, said cross sections each having a major axis and minor axis perpendicularly intersecting each other, said major axis of the ellipse in cross section of said first bar body being directed longitudinally of a bicycle when said handle is mounted thereon, the major axis of the cross-section of each of said first bent portions and second straight portions at said second bar bodies being directed laterally of the bicycle, the major axis of the elliptical cross section of each of said second bent portions at said second bar bodies being directed longitudinally of the bicycle.

9. The improved drop type handle for a bicycle according to claim 8, wherein the major axis of the cross-section of said first bar body is arranged to be slanted at a front end stepwise downwardly with respect to a horizontal line outwardly from said mounting portion.

10. The improved drop type handle for a bicycle according to claim 8 or 9, wherein the major axis of the cross section of each of said second bar bodies is slanted to position an inner end upwardly with respect to an outer end.

* * * * *